United States Patent [19]

Michel et al.

[11] Patent Number: 5,030,601

[45] Date of Patent: Jul. 9, 1991

[54] PROCESS FOR THE PRODUCTION OF SINTERABLE ZIRCONIUM OXIDE POWDER

[75] Inventors: Béatrice Michel, Neuhausen am Rheinfall; Karl Mosimann, Beringen; Heinrich Hofmann, Andelfingen; Dale Overturf, Hallau, all of Switzerland

[73] Assignee: Lonza Ltd., Gampel/Valais, Switzerland

[21] Appl. No.: 516,778

[22] Filed: Apr. 30, 1990

[30] Foreign Application Priority Data

May 2, 1989 [CH] Switzerland .................. 1666/89

[51] Int. Cl.[5] .................. C04B 35/48; C04B 35/49
[52] U.S. Cl. .................. 501/103; 501/104; 501/105; 423/593; 423/608
[58] Field of Search .................. 501/103, 104, 105; 423/593, 598, 608, 611

[56] References Cited

U.S. PATENT DOCUMENTS

| | | | |
|---|---|---|---|
| 4,501,818 | 2/1985 | Rossi | 501/103 X |
| 4,741,894 | 5/1988 | Molas | 423/611 X |
| 4,769,351 | 9/1988 | Soumiya et al. | 501/105 |
| 4,772,576 | 9/1988 | Kimura et al. | 501/105 |
| 4,810,680 | 3/1989 | Brickford et al. | 501/103 |
| 4,822,575 | 4/1989 | Ngian et al. | 423/608 X |
| 4,851,293 | 7/1989 | Egerton et al. | 501/103 X |
| 4,886,768 | 12/1989 | Tien | 501/104 |

*Primary Examiner*—Karl Group
*Attorney, Agent, or Firm*—Fisher, Christen & Sabol

[57] ABSTRACT

A sinterable powder of zirconium dioxide and additives from the group of oxides consisting of titanium, tantalum, as well as optionally magnesium, aluminum, scandium, yttrium and rare earths, incorporated in the crystal lattice of the zirconium dioxide. The sinterable powder is obtained by coprecipitation of zirconium hydroxide and the hydroxides and/or hydrated oxides of the additives from an essentially aqueous solution, with drying and calcining. Hydrolysis-sensitive starting materials, such as, $TiCl_4$, are used in the form of their reaction products with multivalent alcohols, such as, ethylene glycol.

32 Claims, 4 Drawing Sheets

PROCESS FOR THE PRODUCTION OF SINTERABLE ZIRCONIUM OXIDE POWDER

BACKGROUND OF THE INVENTION

1. Field Of The Invention

The invention relates to sinterable zirconium oxide powder and a process of preparing such sinterable zirconium oxide powder.

2. Background Art

To produce ceramic made of partially stabilized (PSZ) or tetragonal (TZP) zirconium oxide, powders made of zirconium dioxide with stabilizer and/or alloy additives are needed that contain these additives in as homogeneous a distribution as possible. This can be achieved, for example, in that from an aqueous zirconium salt solution, which additionally contains salts of the desired alloy elements, the hydroxides or hydrated oxides of the zirconium and of the alloy elements are precipitated together, dried and calcined. Here, usual above all as a stabilizer additive is yttrium oxide that is homogeneously dissolved in the powder obtainable in the way described above and that is usually present in a concentration of about 3 mol percent (about 5 to 6 percent by weight). It is true that the ceramic produced from this powder exhibits good mechanical properties at normal temperature but shows, upon being at a temperature between 100° and 400° C. for a prolonged time, a great decrease in strength by conversion into the monoclinic modification. Therefore, it is desirable to have sinterable zirconium oxide powders available that contain other stabilizer or alloy elements that prevent or delay this undesired strength decrease.

But the use of the process of coprecipitation from aqueous solutions was not previously possible for several potential stabilizer or alloy elements because the available salts of these stabilizer or alloy elements were not stable enough in aqueous solution. Especially $TiCl_4$ and $TaCl_5$, which hydrolyze immediately with water are noted. This difficulty was circumvented previously by using, instead of the halides, the corresponding alkoxides which can be hydrolyzed in a controllable way. But because of the considerably higher prices of these alkoxides compared to the chlorides, this method has the disadvantage of high costs.

Broad Description Of The Invention

The object of the invention is to provide sinterable zirconium oxide powder having a wide selection of stabilizer and alloy additives that are to be distributed as homogeneously as possible and to provide an economical process for the production of such powder without using alkoxides.

The object of the invention is provided by the sinterable zirconium oxide powder of the invention and the production process of the invention.

The invention involves sinterable powder made of zirconium dioxide, optionally with one or more oxides from the group consisting of magnesium, aluminum, scandium, yttrium and rare earths, for the production of compacts of mostly tetragonal zirconium oxide ceramic. The powder contains 50 to 99.9 percent by weight of zirconium dioxide, and contains at least another oxide of titanium and/or tantalum. All foreign oxides are incorporated in the crystal lattice of the zirconium dioxide.

The invention also involves a process for the production of the sinterable powder of the invention. The process includes the steps of precipitation, filtration, washing, drying and calcination. At least one titanium-(IV) and/or tantalum(V) halide is reacted with at least one multivalent alcohol from the group consisting of ethylene glycol, diethylene glycol, triethylene glycol, tetraethylene glycol and 1,2-propanediol. Then the reaction material is optionally diluted with water and mixed with an aqueous zirconium salt solution that optionally contains a salt of a metal from the group consisting of magnesium, aluminum, scandium, yttrium and rare earths, or a mixture of such salts. The dissolved salts are simultaneously precipitated with a basic solution as hydroxides and/or hydrated oxides.

The sinterable powder according to the invention contains, as alloy elements, at least one oxide from the group titanium dioxide and tantalum oxide incorporated in the crystal lattice of the zirconium dioxide, i.e., is present in the form of mixed crystals. This greatest possible homogeneity of the distribution can be seen from the X-ray diffraction diagrams, which reveal no diffraction lines that would be attributable to additional crystalline phases, but rather exhibit a significant, generally linear shifting, as a function of the content of alloy elements, of the diffraction lines of the tetragonal and/or monoclinic zirconium dioxide. This is definite proof of a change in the lattice constants by the formation of mixed crystals. Besides both of the above-mentioned oxides, the powders according to the invention can also contain other oxides as stabilizer or alloy elements. Such additives are, for example, oxides of magnesium, aluminum, scandium, yttrium or the rare earths (lanthanum and lanthanides). The use of these additives, alone as well as in combinations, as stabilizer or alloy elements for zirconium dioxide is known in the art. In the powders according to the invention these additives and other additives (when used) are also incorporated in the crystal lattice of the zirconium oxide.

Suitably the additives are present in a total amount of 0.1 to 50 percent by weight so that the powder correspondingly exhibits a zirconium dioxide content of 50 to 99.9 percent by weight. Preferably the concentration of the additives amounts to 90 to 100 percent of the maximum solubility. The maximum solubility can be determined by determining the lattice constants of the mixed crystals by X-ray diffraction. With increasing concentration, the lattice constants change in more or less linear fashion until reaching the maximum solubility and when it is exceeded they remain constant and new phases appear.

The lattice constants of several alloyed powders according to the invention are shown in Table 1 in comparison with those of pure zirconium oxide:

TABLE I

|  | Phase | a[Å] | b[Å] | c[Å] | $\beta$[°] |
| --- | --- | --- | --- | --- | --- |
| $ZrO_2$* | m | 5.1477 | 5.2030 | 5.3156 | 99.23 |
| $ZrO_2$** | t | 5.12 | (5.12) | 5.25 | (90) |
| $ZrO_2$ + 10% by wt. $TiO_2$ | m | 5.1193 | 5.1602 | 5.3247 | 98.812 |
| $ZrO_2$ + 10% by wt. $TiO_2$ + | t | 5.0655 | (5.0655) | 5.1948 | (90) |

TABLE I-continued

| | Phase | a[Å] | b[Å] | c[Å] | β[°] |
|---|---|---|---|---|---|
| 2.5% by wt. Y$_2$O$_3$ | | | | | |

Notes:
m = monoclinic
t = tetragonal
*according to ASTM index number 13-307
**according to ASTM index number 17-923

The sinterable powder according to the invention is suitably obtained by coprecipitation of the hydroxides and/or hydrated oxides of the zirconium and of the alloy or stabilizer additives from an essentially aqueous solution and by the further processing, such techniques being known in the art, of the precipitation product thusly obtained by filtration, washing, subsequent drying and calcination.

Here the term hydroxides or hydrated oxides means not only the compounds with the exact composition $M^{n+}(OH)^{31}{}_n$, but all of those products that precipitate from aqueous solutions of the corresponding salts at high enough pH and that can be converted into the oxides by heating.

Surprisingly, it was found that also salts, in particularly halides, that hydrolyze immediately with water, such as, TiCl$_4$ and TaCl$_5$, can be processed in an essentially aqueous solution if they are reacted in advance with a multivalent alcohol from the group consisting of ethylene glycol, diethylene glycol, triethylene glycol, tetraethylene glycol, 1,2-propanediol and a mixture of these alcohols. During this reaction a clear solution forms in which the above-mentioned salts or halides are present, presumably in complexed or colloidal form. The increase in viscosity observed with increasing concentration of dissolved metal salt or halide points to a polymeric character of the product formed.

Preferably, mixtures with a content of 1 to 20 percent by weight of the metal halide in the multivalent alcohol are produced by slowly adding the metal halide with strong stirring. The reaction heat released during the addition can make a cooling necessary to prevent excess temperature increase.

The solutions of the hydrolysis-sensitive metal salts or halides thusly obtained can then be diluted with water without hydrolysis products precipitating. The water is preferably added in a ratio of about 1:1 to 1:3, especially preferably about 1:1, at a temperature between 0° and 95° C., preferably at 20° C. Here also a certain development of heat is observed. This dilution step is used to reduce the viscosity of the solutions and to facilitate the subsequent mixing operation. The dilution has no effect on the quality of the product, but rather facilitates the handling of the solution and the exact adjustment of the desired composition.

The solution of the metal salts or halides in the multivalent alcohol, optionally diluted with water, is then mixed with an aqueous solution of a zirconium salt. The zirconium salt solution optionally contains other metal salts, not sensitive to hydrolysis, that are precursors of oxides that belong to the prior art as alloy or stabilizer additives for zirconium dioxide. To the prior art there belong, for example, the oxides of magnesium, aluminum, scandium, yttrium and rare earths. These additives are preferably used as chlorides in hydrochloric solution.

Preferably zirconium oxychloride is used as the zirconium salt; especially preferred is a solution of zirconium oxychloride with a content of 15 to 30 percent by weight calculated as ZrO$_2$. The mixing is performed preferably at a temperature of 10° to 40° C. Of course, one can introduce the salts not sensitive to hydrolysis also by means of the solution with the multivalent alcohol, but this methods brings no further advantages.

The essentially aqueous solution of the zirconium salt thus finally obtained with the alloy and stabilizer additive is highly acidic with a pH of typically less than 1. By adding a basic solution, the product is precipitated at a pH in the range of preferably 6 to 12.5. A precipitation in the pH range between 6 and 8 is especially preferred. By a suitable measurement and metering device, the pH is especially advantageously kept so constant during the precipitation that the variations amount to no more than plus or minus 0.3. Ammonia or sodium hydroxide is preferably used as the base; aqueous ammonia solution is especially preferred.

The acidic solution of the zirconium salt with the alloy and stabilizer additives is preferably neutralized by the simultaneous addition of water and the basic solution. Thus the hydroxides or hydrated oxides are homogeneously precipitated as precursors of the ceramic powder. This occurs preferably in a continuous process using a flow reactor with dispersing stirrer and feed of the solutions by metering pumps.

The remaining steps in the production of the sinterable powder according to the invention are performed in a way known in the art. For this purpose, the dispersion present after the precipitation is suitably filtered, for example, with a filter press, the filter cake is washed until no anions of the salts used and, if sodium hydroxide was used as a base, no more sodium can be detected in the washings, and dried. The dried filter cake is crushed and calcined at 600° to 1000° C.

After calcination, the agglomerates formed are broken up by a grinding operation, for example, a wet grinding in a ball mill. The ground slip thusly obtained is preferably spray dried.

A preferred use of the sinterable powder according to the invention is the production of sintered parts that make especially stringent demands on their mechanical properties, especially those that are used in a moist or aggressive atmosphere or for a prolonged time at high temperatures. Typical examples of such sintered parts are pump parts in chemistry, motor parts, bioceramics, etc.

DETAILED DESCRIPTION OF THE INVENTION

The following examples clarify the properties of the powder according to the invention and the sinter products that can be obtained from it, as well as the performing of the process according to the invention.

EXAMPLE 1

Production of $ZrO_2/TiO_2/Y_2O_3$ powders

The three alloy elements were mixed in dissolved form according to the desired composition of the final product (87.5 percent by weight of $ZrO_2$, 10 percent by weight of $TiO_2$ and 2.5 percent by weight of $Y_2O_3$). The individual components were converted into an aqueous solution as follows:

(a) $ZrOCl_2 \cdot 8 H_2O$ was dissolved in water. The concentration of the solution was 15 to 25 percent by weight of $ZrO_2$.

(b) $Y_2O_3$ was converted with diluted (about 20 percent) hydrochloric acid into a solution of $YCl_3$. The concentration of the solution was 10 to 15 percent by weight of $Y_2O_3$.

(c) $TiCl_4$ was diluted by mixing with ethylene glycol to a concentration of 8 to 12 percent by weight (calculated as $TiO_2$). The $TiCl_4$ was brought into a form that made possible a greater dilution with water without hydrolysis.

The solution was mixed and the powder precipitated from the acidic reaction solution at room temperature with ammonia solution or NaOH solution at constant pH with intensive stirring. The precipitated product was filtered and washed free of chlorine or of chlorine and sodium, dried and calcined at 650° to 750° C. The resultant agglomerates were deagglomerated by wet grinding in a ball mill. The powder present in a suspension was desiccated by spray drying. The precipitated powder had a regular submicron particle size distribution and a homogeneous chemical composition.

| Crystallite size: | 20 to 30 nm |
| --- | --- |
| Specific surface (BET): | 30 to 40 m²/g. |

The shifting of the diffraction lines of the monoclinic and/or tetragonal zirconium dioxide proved the solubility of the different elements in the crystal lattice of the zirconium dioxide.

Figure 1:
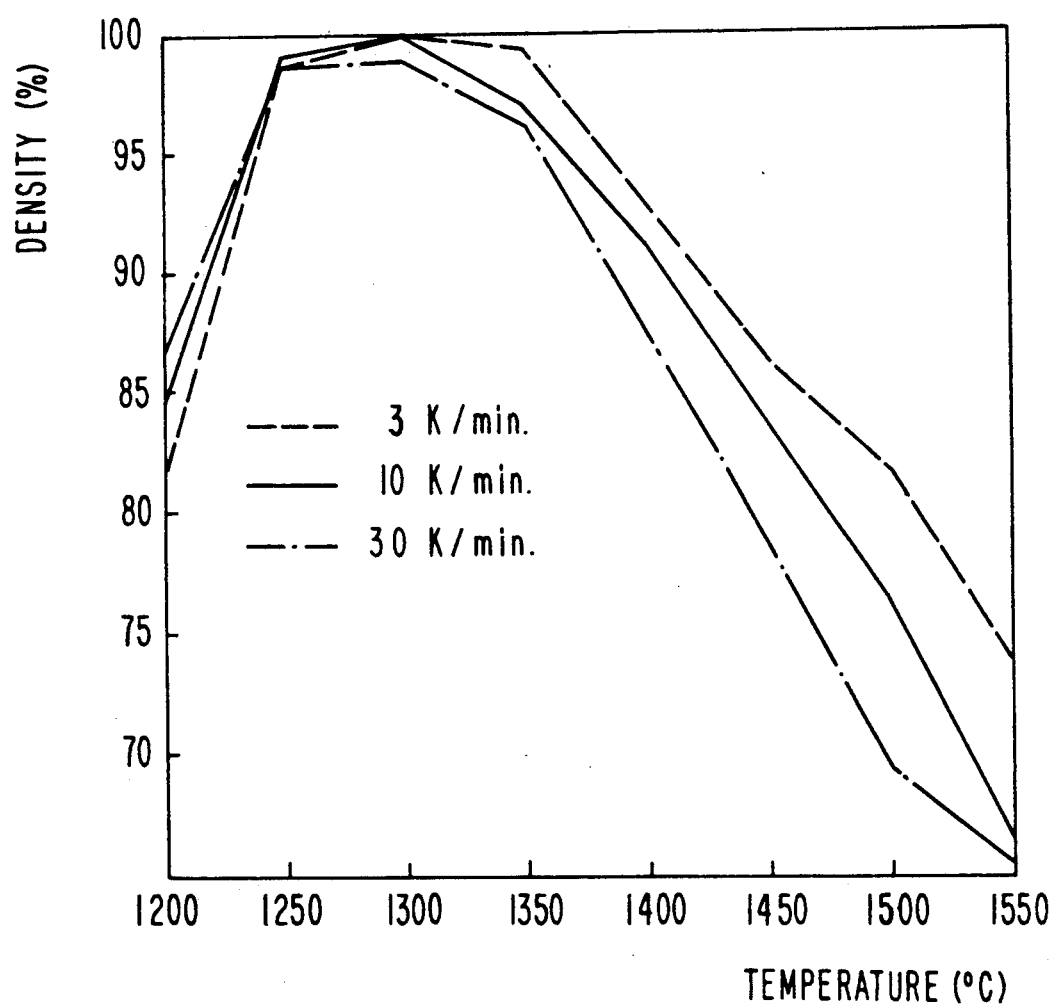
FIG. 1 is a graph of density versus temperature regarding invention products.
Figure 2:
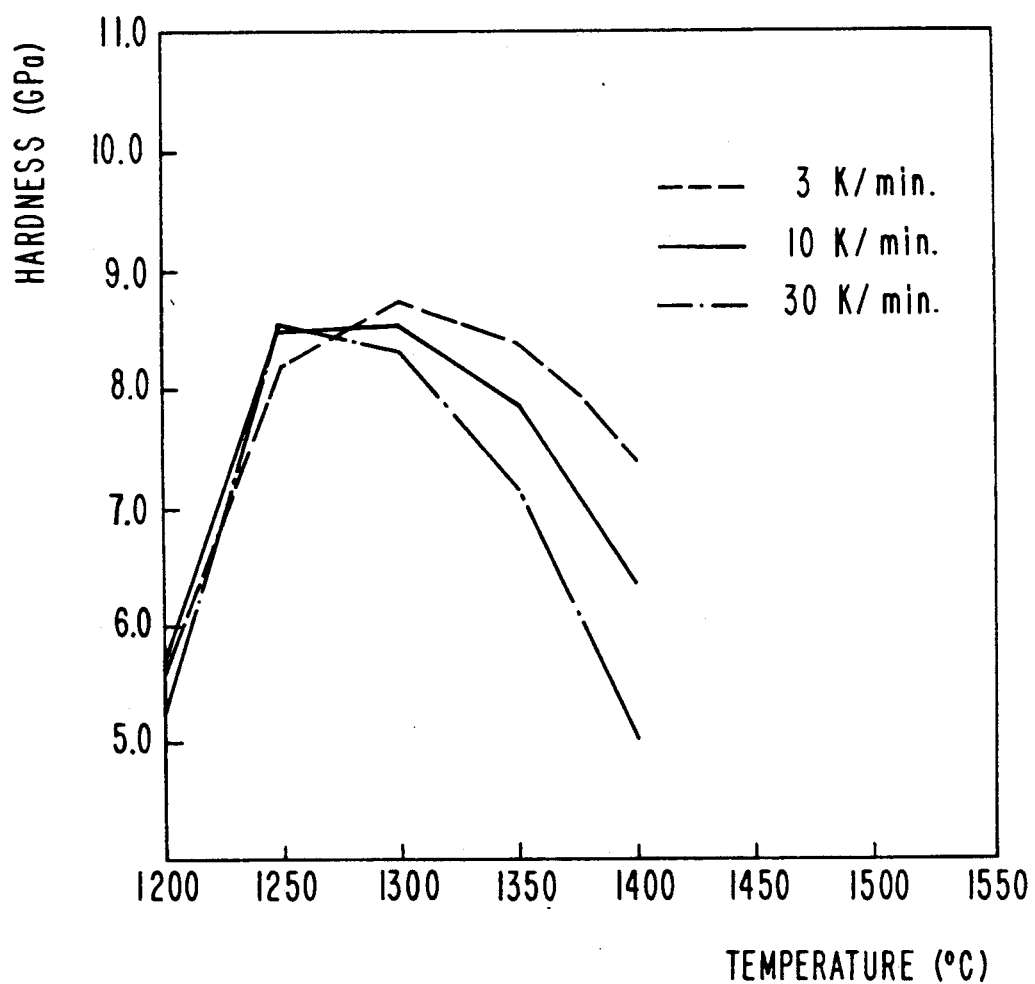
FIG. 2 is a graph of hardness versus temperature regarding invention products.
Figure 3:
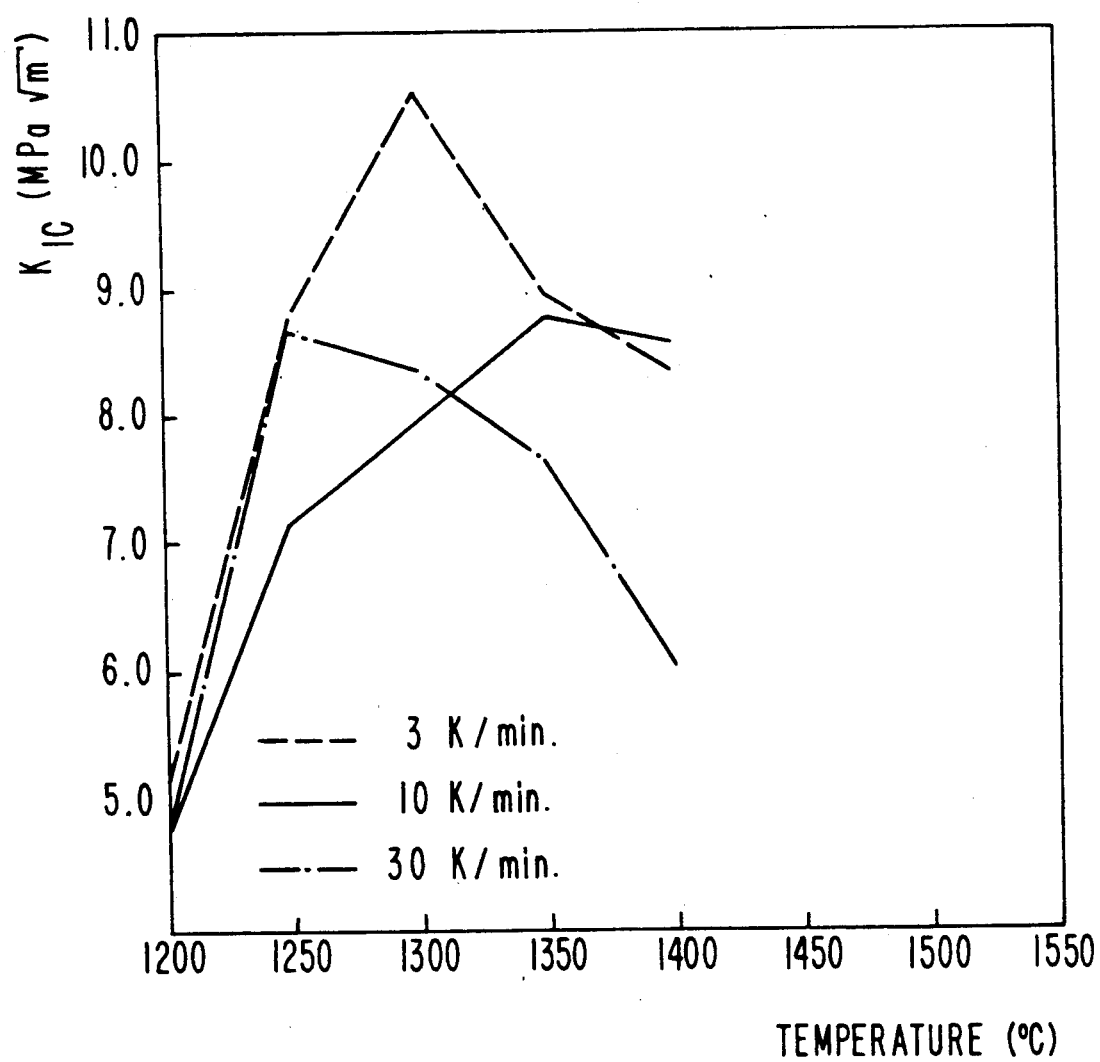
FIG. 3 is a graph of K$_{IC}$ versus temperature regarding invention products.
Figure 4:
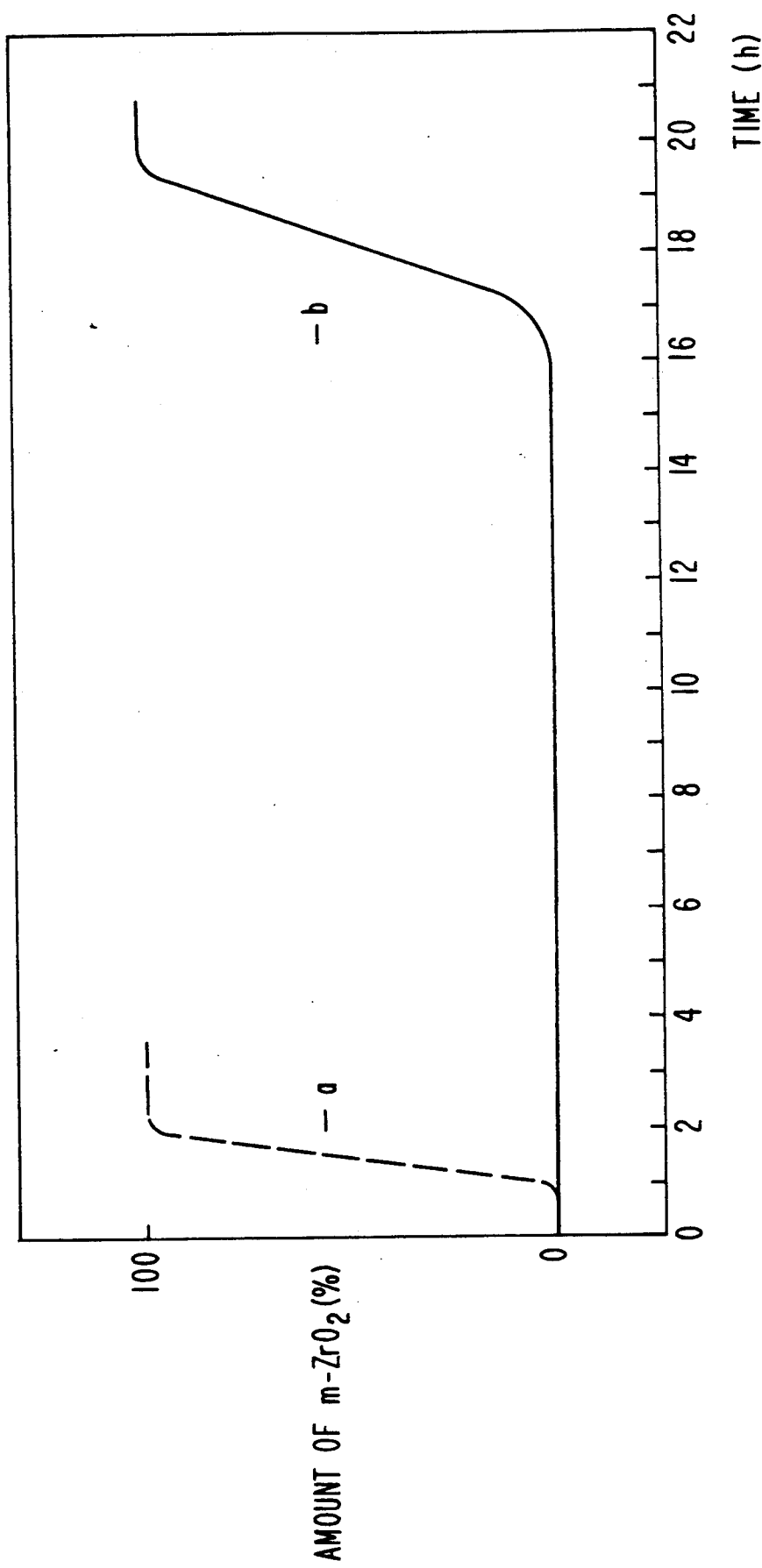
FIG. 4 is a graph of the amount of monoclinic ZrO$_2$ versus time.

Moldings of these powders were sintered with a heating rate between 3 and 30 K/min, a maximum temperature between 1200° and 1550° C. with a residence time between 5 minutes and 10 hours. Density, microhardness, toughness $K_{IC}$ according to Niihara and flexural strength were determined on the sinter compacts thusly obtained. The determination of the microhardness was performed on a Durimet ® small-scale hardness tester with a diamond according to Vickers and a load of 100 g. The average value in each case was made from five measurements. To determine the toughness a diamond according to Vickers was also used— the load was 31.25 kg for 5 seconds. Further, the conversion into the monoclinic phase was studied by treatment with water of 250° C. in the autoclave at 3.8 MPa. The best results were achieved with heating rates of 3 to 10 K/min and a residence time of 1 hour at 1250° to 1350° C. The mechanical properties of the sample compacts thusly obtained as a function of the sinter temperature and heating rate are represented in FIGS. 1 to 3. FIG. 1 shows the density achieved in percent of the theoretical density for sinter temperatures of 1200° to 1550° C. and heating rates of 3, 10 and 30 K/min. FIG. 2 shows the hardnesses achieved under the same conditions, and FIG. 3 shows the toughness valves. FIG. 4 shows the conversion from the tetragonal into the monoclinic modification for sinter compacts according to the prior art (stabilized with 3 mol percent of $Y_2O_3$, curve a) and from the powder according to the invention (curve b). The portion of the monoclinic phase is plotted against the exposure time to water at 250° C. and 3.8 MPa. The product according to the prior art after about 2 hours has already been converted completely into the monoclinic modification, while the product according to the invention after 16 hours is still present almost completely in the tetragonal form.

The mechanical properties achieved under optimal sintering conditions were as follows:

| hardness | greater than 8 GPa |
| --- | --- |
| $K_{IC}$ | greater than 8 MPa.$\sqrt{m}$ |
| flexural strength | greater than 600 MPa. |

The grain structure was regular and the grain size was less than 300 nm.

EXAMPLE 2

Production of a $ZrO_2/TiO_2/Y_2O_3/Al_2O_3$

The powder from Example 2 was produced as in Example 1, but $Al_2O_3$ was also precipitated. For this purpose, the aluminum was used in the form of a hydrochloric solution of $AlCl_3$ together with $YCl_3$, and the precipitation was performed with NaOH solution. The composition of the finished powder was 67.5 percent by weight of $ZrO_2$, 10 percent by weight of $TiO_2$, 2.5 percent by weight of $Y_2O_3$ and 20 percent by weight of $Al_2O_3$. The crystallite size and the surface corresponded to those in Example 1. The sample was sintered at 1500° C. to achieve the maximum density. The hardness was greater than 12 GPa, the $K_{IC}$ was greater than 7 MPa.$\sqrt{m}$ and the flexural strength was greater than 500 MPa. The stability in humid atmosphere wa also considerably better than with 3 mol percent of Y-TZP.

EXAMPLE 3

Production of a $ZrO_2/TiO_2/Ta_2O_5$ powder

As in Example 1, from $ZrOCl_2 \cdot 8H_2O$, $TiCl_4$ and $TaCl_5$ there was produced a powder of 55 percent by weight of $ZrO_2$, 10 percent by weight of $TiO_2$ and 35 percent by weight of $Ta_2O_5$. The powder was sintered at 1500° C. The sample compacts subsequently exhibited a hardness of greater than 10 GPa and a toughness $K_{IC}$ of greater than 6 Mpa $\sqrt{m}$.

The lattice constants of the tetragonal $ZrO_2$-phase in the powder are:

$a=b=5.0478$ Å

$c=5.2476$ Å

No other phases were found. The strong deviation of the value for the a-axis from the corresponding value of pure $ZrO_2$ shows, that all $TiO_2$ and $Ta_2O_5$ are incorporated in the crystal lattice of the zirconium dioxide.

What is claimed is:

1. Process for the production of a sinterable powder which comprises zirconium dioxide, optionally with at least one oxide selected from the group consisting of a magnesium oxide, an aluminum oxide, a scandium oxide, a yttrium oxide and a rare earth oxide, for the production of at least one compact of mostly tetragonal zirconium oxide ceramic, the powder having 59 to 99.9 percent by weight of zirconium dioxide, the powder containing at least one oxide selected from the group consisting of a titanium oxide and a tantalum oxide, and all of the non-zirconium oxides being incorporated in the crystal lattice of the zirconium dioxide, comprising:

(a) reacting at least one halide selected from the group consisting of a titanium (IV) halide and a tantalum (V) halide, with at least one multivalent alcohol selected from the group consisting of ethylene glycol, diethylene glycol, triethylene glycol, tetraethylene glycol and 1,2-propanediol, whereby a reaction composition containing at least one salt of said titanium, said tantalum or both and said at least one multivalent alcohol, (b) optionally diluting reaction composition (a) with water, whereby a reaction composition is formed;

(c) mixing reaction composition (a) or reaction composition (b) with an aqueous zirconium salt solution that optionally contains at least one metal salt selected from the group consisting of a magnesium salt, an aluminum salt, a scandium salt, a yttrium salt, a rate earth salt, said at least one titanium, tantalum or titanium and tantalum salt and said optional at least one metal salt being dissolved in said aqueous zirconium salt;

(d) simultaneously precipitating said dissolved salts from mixture (c) with a basic solution selected from the group consisting of an aqueous ammonia solution, a hydroxide solution and a hydrated solution;

(e) filtering the precipitate from basic solution-treated mixture (c);

(f) washing filtered precipitate (e);

(g) drying washed, filtered precipitate (f); and (h) calcining dried, washed, filtered precipitate (g), whereby said sinterable powder is produced.

2. Process according to claim 1 wherein $TiCl_4$, $TaCl_5$ or both are used as the titanium (IV) and/or tantalum (V) halide 3. Process according to claim 2 wherein ethylene glycol is used as said at least one multivalent alcohol.

4. Process according to claim 3 wherein a zirconium oxychloride solution having a zirconium content of 15 to 30 percent by weight, calculated as $ZrO_2$, is used as said aqueous zirconium salt solution.

5. Process according to claim 4 wherein aqueous ammonia solution is used as said basic solution.

6. Process according to claim 4 wherein sodium hydroxide is used as said hydroxide in said basic solution.

7. Process according to claim 6 wherein said precipitation reaction (d) is performed at a pH of 6 to 12.5.

8. Process according to claim 7 wherein said precipitation reaction (d) is performed at a pH of 6 to 8.

9. Process according to claim 8 wherein the pH during said precipitation reaction (d) is kept constant within an interval of plus or minus 0.3.

10. Process according to claim 1 wherein ethylene glycol is used as said at least one multivalent alcohol.

11. Process according to claim 1 wherein a zirconium oxychloride solution having a zirconium content of 15 to 30 percent by weight, calculated as $ZrO_2$, is used as said aqueous zirconium salt solution.

12. Process according to claim 1 wherein aqueous ammonia solution is used as said basic solution.

13. Process according to claim 1 wherein sodium hydroxide is used as said hydroxide in said basic solution.

14. Process according to claim 1 wherein said precipitation reaction (d) is performed at a pH of 6 to 12.5.

15. Process according to claim 1 wherein said precipitation reaction (d) is performed at a pH of 6 to 8.

16. Process according to claim 1 wherein the pH during said precipitation reaction (d) is kept constant within an interval of plus or minus 0.3.

17. Process according to claim 1 wherein said calcined precipitate (h) is further molded and sintered, whereby a sintered molded compact made of tetragonal or partially stabilized zirconium oxide ceramic is produced.

18. Process according to claim 1 wherein the non-zirconium oxides are incorporated in the crystal lattice of the zirconium dioxide in an amount of from 90 to 100 percent of the maximum solubility.

19. Process according to claim 18 wherein 0.1 to 15 percent by weight of $TiO_2$ is incorporated in the crystal lattice of the zirconium dioxide.

20. Process according to claim 18 wherein 7.5 to 12.0 percent by weight of $TiO_2$ and 2.5 to 3.5 percent by weight of $Y_2O_3$ are incorporated in the crystal lattice of the zirconium dioxide.

21. Process according to claim 18 wherein 7.5 to 12.0 percent by weight of $TiO_2$, 2.5 to 3.5 percent by weight of $Y_2O_3$ and 5.0 to 30.0 percent by weight of $Al_2O_3$ are incorporated in the crystal lattic of the zirconium dioxide.

22. Process according to claim 18 wherein 13.0 to 40.0 percent by weight of $Ta_2O_5$ is incorporated in the crystal lattice of the zirconium dioxide.

23. Process according to claim 18 wherein 13.0 to 40.0 percent by weight of $Ta_2O_5$ and 0.1 to 5.0 percent by weight of $MgO$ are incorporated in the crystal lattice of the zirconium dioxide.

24. Process according to claim 18 wherein 0.1 to 12.0 percent by weight of $TiO_2$ and 5.0 to 10.0 percent by weight of $CeO_2$ are incorporated in the crystal lattice of the zirconium dioxide.

25. Process according to claim 18 wherein 0.1 to 12.0 percent by weight of $TiO_2$ and 5.0 to 10.0 percent by weight of $Sc_2O_3$ are incorporated in the crystal lattice of the zirconium dioxide.

26. Process according to claim 1 wherein 0.1 to 15 percent by weight of $TiO_2$ is incorporated in the crystal lattice of the zirconium dioxide.

27. Process according to claim 11 wherein 7.5 to 12.0 percent by weight of $TiO_2$ and 2.5 to 3.5 percent by weight of $Y_2O_3$ are incorporated in the crystal lattice of the zirconium dioxide.

28. Process according to claim 11 wherein 7.5 to 12.0 percent by weight of $TiO_2$, 2.5 to 3.5 percent by weight of $Y_2O_3$ and 5.0 to 30.0 percent by weight of $Al_2O_3$ are incorporated in the crystal lattice of the zirconium dioxide.

29. Process according to claim 1 wherein 13.0 to 40.0 percent by weight of $Ta_2O_5$ is incorporated in the crystal lattice of the zirconium dioxide.

30. Process according to claim 1 wherein 13.0 to 40.0 percent by weight of $Ta_2O_5$ and 0.1 to 5.0 percent by weight of $MgO$ are incorporate in the crystal lattice of the zirconium dioxide.

31. Process according to claim 1 wherein 0.1 to 12.0 percent by weight of $TiO_2$ and 5.0 to 20.0 percent by weight of $CeO_2$ are incorporated in the crystal lattice of the zirconium dioxide.

32. Process according to claim 1 wherein 0.1 to 12.0 percent by weight of $TiO_2$ and 5.0 to 10.0 percent by weight of $Sc_2O_3$ are incorporated in the crystal lattice of the zirconium dioxide.

* * * * *